(12) United States Patent
Klassen et al.

(10) Patent No.: US 11,949,134 B2
(45) Date of Patent: Apr. 2, 2024

(54) REDOX FLOW BATTERY ARRAYS AND METHODS FOR STATE OF CHARGE BALANCING

(71) Applicant: INVINITY ENERGY SYSTEMS (CANADA) CORPORATION, Vancouver (CA)

(72) Inventors: Andrew Klassen, Vancouver (CA); David Genders, Vancouver (CA); Matthew Harper, Vancouver (CA)

(73) Assignee: Invinity Energy Systems (Canada) Corporation, Vancouver (CA)

( * ) Notice: Subject to any disclaimer, the term of this patent is extended or adjusted under 35 U.S.C. 154(b) by 0 days.

(21) Appl. No.: 17/631,983

(22) PCT Filed: Jul. 29, 2020

(86) PCT No.: PCT/US2020/044075
§ 371 (c)(1),
(2) Date: Feb. 1, 2022

(87) PCT Pub. No.: WO2021/025925
PCT Pub. Date: Feb. 11, 2021

(65) Prior Publication Data
US 2022/0285709 A1 Sep. 8, 2022

Related U.S. Application Data

(60) Provisional application No. 62/882,071, filed on Aug. 2, 2019.

(51) Int. Cl.
*H01M 8/04746* (2016.01)
*H01M 8/04082* (2016.01)
(Continued)

(52) U.S. Cl.
CPC ... *H01M 8/04753* (2013.01); *H01M 8/04186* (2013.01); *H01M 8/04201* (2013.01);
(Continued)

(58) Field of Classification Search
CPC .. H01M 10/44; H01M 10/482; H01M 10/488; H01M 8/04186; H01M 8/04201;
(Continued)

(56) References Cited

U.S. PATENT DOCUMENTS

2005/0158614 A1 7/2005 Hennessy
2015/0325874 A1* 11/2015 Spaziante ............. H01M 8/249
429/418
2021/0351428 A1* 11/2021 Modderno ........ H01M 8/04201

FOREIGN PATENT DOCUMENTS

EP 3258526 A1 12/2017

OTHER PUBLICATIONS

Int'l Search Report for PCT/US2020/044075, dated Nov. 17, 2020.

* cited by examiner

*Primary Examiner* — Victoria H Lynch
(74) *Attorney, Agent, or Firm* — MaxGoLaw PLLC

(57) ABSTRACT

Designs of redox flow battery arrays and methods for balancing state of charge within the arrays are disclosed. Flow battery unit strings in the arrays which comprise strings of flow battery units (in which units share a common electrolyte pair) are balanced by measuring the states of charge of the common electrolyte pairs and appropriately regulating flow in one or more of the associated anolyte and catholyte circuits so as to balance the state-of charge in the flow battery unit strings. The apparatus required, i.e. state-of-charge measuring device, flow regulator, and controller, represents a substantial simplification to state of the art approaches.

21 Claims, 5 Drawing Sheets

(51) Int. Cl.
*H01M 8/04186* (2016.01)
*H01M 8/04537* (2016.01)
*H01M 8/18* (2006.01)
*H01M 8/2455* (2016.01)

(52) U.S. Cl.
CPC ... *H01M 8/04559* (2013.01); *H01M 8/04589* (2013.01); *H01M 8/04619* (2013.01); *H01M 8/188* (2013.01); *H01M 8/2455* (2013.01)

(58) Field of Classification Search
CPC ......... H01M 8/04477; H01M 8/04559; H01M 8/04589; H01M 8/04611; H01M 8/04619; H01M 8/04753; H01M 8/188; H01M 8/24; H01M 8/2455; Y02E 60/10; Y02E 60/50

See application file for complete search history.

REDOX FLOW BATTERY ARRAYS AND METHODS FOR STATE OF CHARGE BALANCING

TECHNICAL FIELD

The present invention pertains to arrays of redox flow batteries and to methods for balancing state of charge of flow battery unit strings in the arrays and of flow battery units within the strings.

BACKGROUND

Redox flow batteries, such as vanadium redox flow batteries, continue to show promise for storing large amounts of electrical energy, such as for load levelling applications. They convert electrical energy into chemical energy that can be stored and then converted into electrical energy which is released when there is a demand. In operation, liquid electrolytes are delivered to a flow battery to either convert electrical energy into chemical energy or to convert chemical energy into electrical energy that can be discharged through an electrical connection to a power load.

An individual redox flow battery cell comprises an anode and a cathode separated by a separator. A negative liquid electrolyte or anolyte is delivered (flowed) from an anolyte storage tank to the anode and a positive liquid electrolyte or catholyte is delivered (flowed) from a catholyte storage tank to the cathode to drive the electrochemically reversible redox reactions. The separator can be a micro-porous separator or an ion exchange membrane and it separates the electrodes and prevents the electrolytes from mixing, but allows selected ions to pass through to complete the redox reactions. After allowing for the redox reactions to take place, the anolyte and catholyte are returned back to their respective storage tanks. Therefore, operating such a redox flow battery requires both an anolyte fluid circuit and a catholyte fluid circuit, each comprising a supply line and a return line that connect the anolyte and catholyte tanks to the anodes and cathodes in the flow battery cell respectively. The state of charge of the cell is determined by the chemical composition or state of the two part electrolyte, namely the anolyte and catholyte.

In many applications, and particularly load levelling applications, numerous flow battery cells are required to store and/or deliver significant amounts of energy and power respectively. Large, complicated arrays of cells are typically employed in which cells are interconnected in various series and parallel combinations. Desirably, many individual flow battery cells in these arrays would share a common anolyte and catholyte supply. Herein, such a combination of cells, is referred to as a flow battery unit. The cells in a flow battery unit may be interconnected in series and/or parallel but all share a common anolyte and catholyte supply. Consequently, all the cells in a flow battery unit are at the same state of charge.

In large arrays, flow battery units may desirably be further interconnected into series and/or parallel strings of flow battery units. Such combined flow battery unit strings deliver and receive power for use in the intended application via a controllable bi-directional power converter or converters (e.g. DC/DC and/or AC/DC converters to increase the operating DC to typically>800 V for connection to commercial AC/DC converters).

Until now, flow battery units with shared, common electrolyte supplies, have not been used effectively in electrical series and/or parallel arrangements due to inability to efficiently and cost effectively manage capacity balancing between them all. In one past approach, the maximum voltage of series connected cells within a flow batter unit might be limited to typically<400 VDC to minimize shunt losses and maximize round trip energy efficiency. In another approach, the preceding may be employed together with the use of a bi-directional DC/DC converter on each flow battery unit in order to control current flow to each flow battery unit individually for capacity matching and balancing between all the flow battery units in a string, while increasing the DC voltage to >800 V for connection to commercial AC/DC converters. Further still, the preceding may be employed along with the use of electrical contactors to switch some series connected stack(s) of cells on and off in certain flow battery units, thus varying the charge/discharge current in discrete steps for capacity balancing. The DC/DC converters may still be used as before to manage current flow and increase voltage.

Increasing the voltage of series stacks of cells within an individual flow battery unit increases system cost, as shunt mitigation measures (longer, thinner flow channels between the cells and stacks, increased pumping power required for the fluid anolyte/catholyte, etc.) increase cost and reduce overall efficiency.

Unfortunately, all of the preceding approaches limit the maximum DC voltage produced from each flow battery unit making flow batteries difficult to integrate with the >800 V DC connection requirement of state-of-the-art AC/DC converters. The use of numerous DC/DC converters in main power flow circuits adds cost and reduces overall round trip efficiency of the system, thus lowering the maximum performance and cost benefits which might be obtained from flow batteries. Further, use of multiple contactors for switching stacks on/off is expensive. Contactors also have short lifetime when switched under load, and cell stacks will continue to discharge electrolyte within the stack(s), lowering system efficiency.

In yet another approach, capacity balancing within series strings of flow battery units may be achieved using subsystems that detect imbalances between flow battery units in the string and then adjust the state of charge in a unit or units appropriately by fluidly interconnecting and mixing a portion of the anolyte tank and the catholyte tank to lower state of charge to a common target (akin to using a bleed resistor to discharge cells within that unit). Such subsystems obviously add undesirable cost and complexity.

While there have been many advances in developing practical redox flow battery arrays for large scale commercial applications, there is still a need for further simplification, efficiency, and cost reduction. Providing improvements in the state of charge balancing and energy storage capacity balancing in series and parallel strings of flow battery units would be particularly of use. The present invention addresses these needs and provides other benefits as disclosed below.

SUMMARY

The present invention discloses improved redox flow battery arrays and methods for balancing state of charge within the arrays. Balancing of flow battery unit strings in the arrays which comprise strings of flow battery units in which units share a common electrolyte pair is accomplished by measuring the states of charge of the common electrolyte pairs involved and then by appropriately regulating flow in one or more of the associated anolyte and catholyte circuits. Embodiments require a state-of-charge measuring device, a flow regulator, and a controller but overall an array of the invention is substantially simplified compared with prior art approaches. For instance, the present redox flow battery array requires only one controllable bi-directional power converter for each of set of flow battery unit strings electrically connected in parallel (i.e. may be absent any additional controllable bi-directional power converter electrically connected to any of the involved flow battery unit strings). Further, the array may be absent any subsystem, as in some prior art approaches, for fluidly interconnecting and mixing anolyte and catholyte tanks to effect state of charge balancing.

Specifically, the invention pertains to a redox flow battery array comprising at least two flow battery unit strings electrically connected in parallel in which each flow battery unit string comprises at least one flow battery unit. Such flow battery units comprise a flow battery string comprising at least one flow battery cell. The flow battery string typically however may comprise numerous cells interconnected in series and/or parallel combinations. Each cell comprises an anode, a cathode, and flow battery unit electrolytes comprising an anolyte and a catholyte. The flow battery unit also comprises an anolyte tank and a catholyte tank for storage of the anolyte and the catholyte of the flow battery unit electrolyte respectively. In some embodiments, more than one tank for each of the anolyte or the catholyte may be employed. Regardless though, the anolyte and catholyte in a given flow battery unit is common to all the cells in that given unit. The flow battery unit also comprises an anolyte circuit comprising a supply line and a return line connecting the anolyte tank to the anodes in the flow battery cells in the flow battery string, and in like manner, a catholyte circuit comprising a supply line and a return line connecting the catholyte tank to the cathodes in the flow battery cells in the flow battery string. The flow battery array additionally comprises a controllable bi-directional power converter electrically connected to each of the flow battery unit strings involved. As mentioned above though, only one such controllable bi-directional power converter is required for the flow battery unit strings involved.

In the present invention, each flow battery unit comprises a state-of-charge measuring device capable of measuring the state of charge of the flow battery unit electrolyte in the unit. Additionally, the array comprises a flow regulator in at least one of the anolyte and the catholyte circuits regulating flow of at least one of the anolyte and the catholyte therethrough in at least one of the flow battery units in the at least two flow battery unit strings. While this may allow for acceptable balancing to be achieved in some embodiments, in a preferred embodiment, flow regulators are provided in each of the anolyte and the catholyte circuits in each of the flow battery units in each the flow battery unit strings involved. And additionally, the array also comprises a controller with inputs connected to each of the state-of-charge measuring devices in the flow battery units and with an output connected to the flow regulator or regulators involved. The output of the controller controls the flow regulator/s so as to regulate the flow of at least one of the anolyte and the catholyte to the anodes and cathodes in the flow battery cells in the flow battery string in accordance with the states of charge of the flow battery unit electrolytes in the flow battery units and thereby balance the state-of charge in the at least two flow battery unit strings.

Arrays of the invention may comprise a plurality of flow battery unit strings electrically connected in parallel (i.e. more than at least two such flow battery unit strings). Further, the flow battery unit strings involved may comprise two or more flow battery units electrically connected in series.

In order to measure the resistance and/or rates of change of resistance of the flow battery units involved, voltage sensors may be incorporated across flow battery units and current sensors provided in series therewith. Resistance and rates of change of resistance of flow battery unit strings may thus provide additional inputs for predictively controlling the array.

In embodiments comprising two or more flow battery units electrically connected in series in the flow battery unit strings, suitable current bypass devices may be employed to balance units within the strings. For instance, for this purpose, each of the flow battery unit strings may comprise a current bypass device electrically connected in parallel to one or more of the flow battery units in these strings.

Various types of devices may be considered for measuring state-of-charge. In one desirable approach, an unloaded (open circuit) reference flow battery cell may be incorporated for each flow battery unit that is supplied with the same anolyte and catholyte supplied to that unit. In this approach, a voltage sensor is connected across the reference flow battery cell for measuring the open circuit voltage of electrolyte flowing into the stacks, and hence state-of-charge, of both the reference flow battery cell and thus for all the cells in the flow battery unit.

In other approaches, the state-of-charge measuring device employed may be colorimetric device or a spectroscopic device that optically access the flow battery unit electrolyte (e.g. via a suitable window in the anolyte and catholyte circuits or tanks) which, as is known in the art, can be used to determine the state of charge of the electrolyte. Alternatively, potentiometric devices other than the reference cell above may be employed to measure state-of-charge of the anolyte and catholyte separately to a common reference electrode (e.g. saturated calomel, silver chloride, etc,), with each being summed to determine the total state-of-charge.

The invention is suitable for use in redox flow battery arrays generally, but particularly for arrays comprising vanadium redox flow batteries. Further, the invention is suitable for use in applications involving a single array or in larger, even more complex applications comprising more than one array of the invention.

Balancing of state-of-charge of the flow battery unit strings in the aforementioned redox battery arrays can be achieved via a method comprising the steps of: using the state-of-charge measuring device, measuring the states-of-charge of the flow battery unit electrolyte in the flow battery unit in each of the at least two flow battery unit strings; inputting the measured states-of-charge to the controller; using the controller, determining a control signal for regulating the flow of at least one of the anolyte and the catholyte to the anodes and cathodes in the flow battery cells in the at least one of the flow battery units in accordance with the states of charge of the flow battery unit electrolytes in the flow battery units so as to balance the state-of charge in the at least two flow battery unit strings; and outputting the control signal to the flow regulator.

In embodiments in which each of the flow battery units comprises an unloaded reference cell and voltage sensor as described above, the step of measuring the states-of-charge can comprise measuring the open circuit voltages of the unloaded reference flow battery cells.

In embodiments in which each of the flow battery unit strings comprises at least two flow battery units electrically connected in series and each of the flow battery unit strings comprises a current bypass device electrically connected in parallel to at least one of the flow battery units in the flow battery unit strings, balancing of the states-of-charge between flow battery units within the flow battery unit strings can be accomplished by shunting a fraction of total current through one or more of the current bypass devices.

Unlike some approaches in the prior art, an advantage of the present invention is that the steps for state of charge balancing may be performed when the array is charging or discharging via the controllable bi-directional power converter. And the method need not be performed at all such times, but perhaps only when the flow battery unit electrolytes are at a low or high state-of-charge.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and not limited to just one.

Herein, the term "string" is used to refer to combinations of items that are electrically interconnected in both series and/or parallel configurations.

With regards to redox flow batteries, state of charge is a function of the state of the flow battery electrolyte. Because the electrolyte comprises both an anolyte and catholyte, total state of charge is thus a function of the combined states of the anolyte and catholyte.

In the following description, redox flow battery arrays are denoted by the letters AR and numbered from 1 to N' (e.g. AR1, AR2, ... ARN'). Flow battery unit strings are denoted by the letter S and numbered from A to N (e.g. SA, SB, ... SN). Flow battery units are denoted according to the unit string they appear in and are numbered from 1 to n (e.g A1, B3, N1, Nn, etc.).

Figure 1:
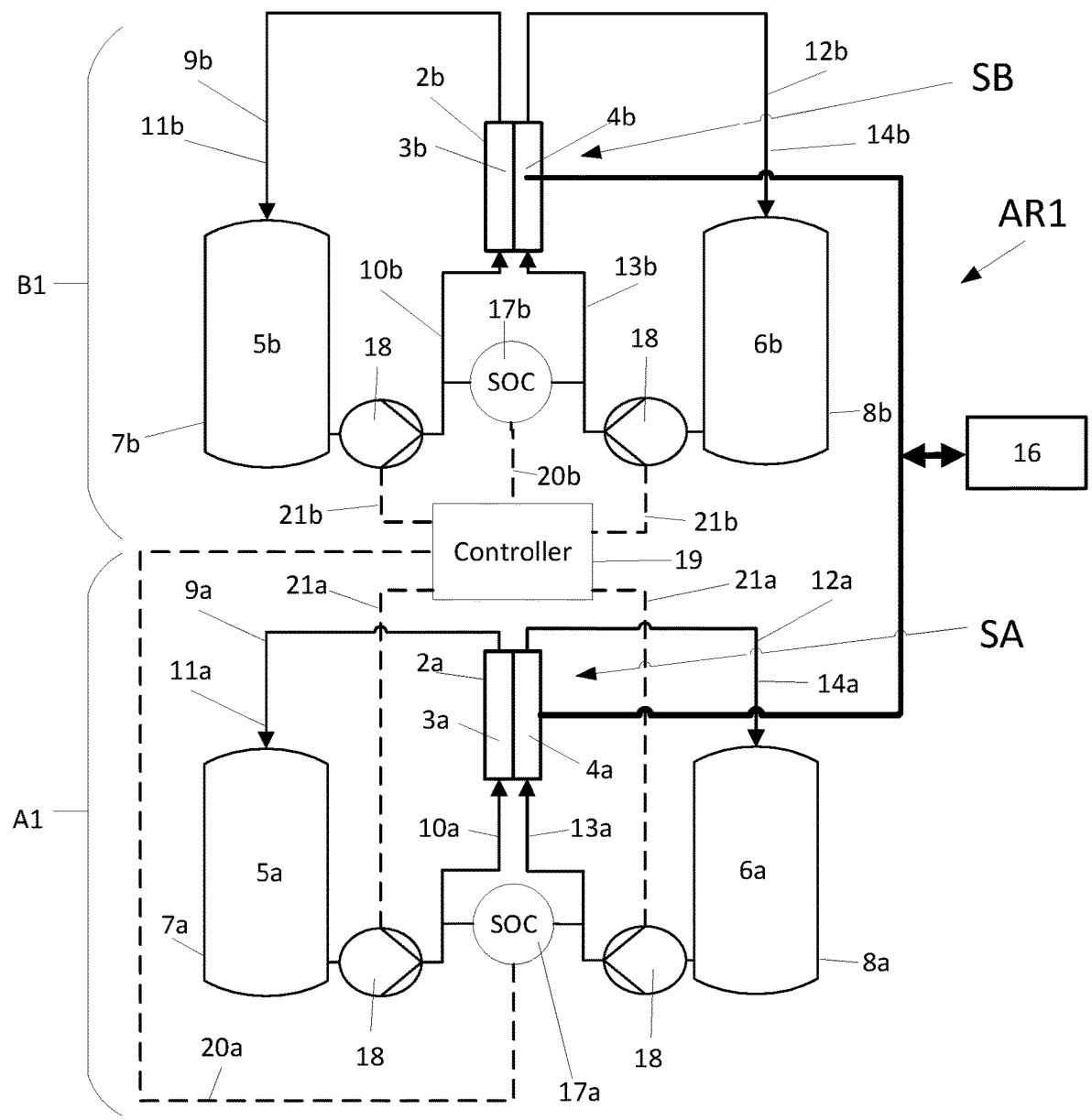
FIG. 1 shows a schematic of a simple embodiment of the invention comprising two flow battery unit strings electrically connected in parallel in which there is only one flow battery unit in each string and one flow battery cell in each unit.

FIG. 1 depicts a schematic of a simple embodiment of redox flow battery array AR1 of the invention comprising only two flow battery unit strings SA, SB electrically connected in parallel. Here, there is only one flow battery unit A1, B1 in each string and only one flow battery cell 2$a$, 2$b$ in each unit. Each cell comprises an anode 3$a$, 3$b$, a cathode 4$a$, 4$b$ and a flow battery unit electrolyte comprising an anolyte 5$a$, 5$b$ and a catholyte 6$a$, 6$b$. Anolyte tanks 7$a$, 7$b$ and catholyte tanks 8$a$, 8$b$ are provided for storage of anolytes 5$a$, 5$b$ and catholytes 6$a$, 6$b$ respectively for each flow battery unit electrolyte in the array. (Note: in some embodiments, more than one tank may be employed to store a common anolyte or a common catholyte supply. Regardless though, each cell in a given flow battery unit shares a common supply of anolyte and a common supply of catholyte. Consequently, each cell in that given flow battery unit also shares the same state of charge.) Further, anolyte circuits 9$a$, 9$b$ comprising supply lines 10$a$, 10$b$ and return lines 11$a$, 11$b$ are provided so as to connect the respective anolyte tanks 7$a$, 7$b$ to the cell anode(s) 3$a$, 3$b$ in one or more cells. In a like manner, catholyte circuits 12$a$, 12$b$ comprising supply lines 13$a$, 13$b$ and return lines 14$a$, 14$b$ are provided so as to connect catholyte tanks 8$a$, 8$b$ to the cell cathode(s) 4$a$, 4$b$ in one or more cells. A controllable bi-directional power converter 16 is electrically connected to each flow battery unit string SA, SB and provides for an appropriate conversion of power from or to the array during discharge or charge of the array respectively. Converter 16 may be operated in voltage, current, or power mode at any time, and may be either a DC/DC or DC/AC converter.

In the present invention, state-of-charge (SOC) measuring devices 17$a$, 17$b$ are provided to measure the state of charge for each flow battery unit electrolyte. A flow regulator is also provided in at least one of the anolyte and the catholyte circuits in order to regulate flow of at least one of the anolyte and the catholyte therethrough. In FIG. 1, flow regulators 18 are shown in each anolyte supply line 10$a$, 10$b$ and each catholyte supply line 13$a$, 13$b$ of each of the flow battery units A1, B1. Controller 19 is also provided to monitor the states of charge and to control flow regulators 18. Accordingly, controller 19 has inputs 20$a$, 20$b$ (shown as dashed lines in this Figure) connected to each of the state-of-charge measuring devices 17$a$, 17$a$ and outputs 21$a$, 21$a$ (shown as dashed lines in this Figure) connected to flow regulators 18. The outputs 21$a$, 21$b$ of controller 19 control flow regulators 18 so as to regulate the flows of anolytes 5$a$, 5$b$ and catholytes 6$a$, 6$b$ to anodes 3$a$, 3$b$ and cathodes 4$a$, 4$b$ in flow battery cells 2$a$, 2$b$ in accordance with the states of charge of the flow battery unit electrolytes in flow battery units A1, B1. By adjusting these flows, the resistance of cells in the flow battery units, and thus the resistance of the flow battery units themselves, can actively be increased or decreased as is required to suitably balance the state-of charge in the flow battery unit strings. Specifically, using the state-of-charge measuring devices, the states-of-charge of the flow battery unit electrolytes are measured. The measured states-of-charge are then input to the controller, and using the controller, appropriate control signals are determined so as to regulate the flow of the anolytes and the catholytes so as to result in a balancing of state-of charge in the flow battery unit strings and these control signals are then output to the flow regulators.

Additional information may also be obtained about the array in order to refine operation of the state-of-charge controller. For instance, the rate of change of state of charge (denoted d(SOC)/dt where SOC represents state of charge) may also be determined. As discussed in the following, the resistance of individual flow battery units, along with rates of change of resistance of these units, may also be determined during operation (e.g. by appropriate inclusion of voltage and current sensors in the array). This information may then be used by the controller for predictive and more robust, accurate control of the state-of-charge balancing method.

In a desirable embodiment, the state-of-charge measuring devices used in such an array may simply comprise an unloaded reference flow battery cell supplied with the same anolyte and the catholyte of the flow battery unit electrolyte. The reference cell will thus be at the same state of charge as the cells in that unit. A voltage sensor is thus connected across the reference flow battery cell in order to measure the open circuit voltage thereof and hence the state of charge of that flow battery unit.

In alternative embodiments though, other devices known to those in the art may be employed to measure state-of-charge. For instance, a suitable colorimetric device or spectroscopic device which is configured into the electrolyte supply or circuit hardware so that it can optically access the flow battery unit electrolyte may be used to do so. Alternatively, potentiometric devices other than the reference cell described above may be employed to measure state-of-charge of the anolyte and catholyte separately to a common reference electrode (e.g. saturated calomel, silver chloride, etc,), with each being summed to determine the total state of charge.

Advantageously, the balancing approach illustrated in FIG. 1 allows for balancing of state of charge between flow battery unit strings without requiring a separate controllable bi-directional power converter electrically connected to each string. Instead, a single controllable bi-directional power converter may serve the needs of each array. Further, subsystems are not required to fluidly interconnect and mix the anolyte tank and the catholyte tank in order to achieve state of charge balancing.

As additional advantages of this approach, the required measuring and controlling steps may be performed when the array is fully in service, i.e. when charging or discharging via the controllable bi-directional power converter. Further, the method steps may only need to be performed periodically, such as at times when the flow battery unit electrolytes are at a low or high state-of-charge.

Figure 2:
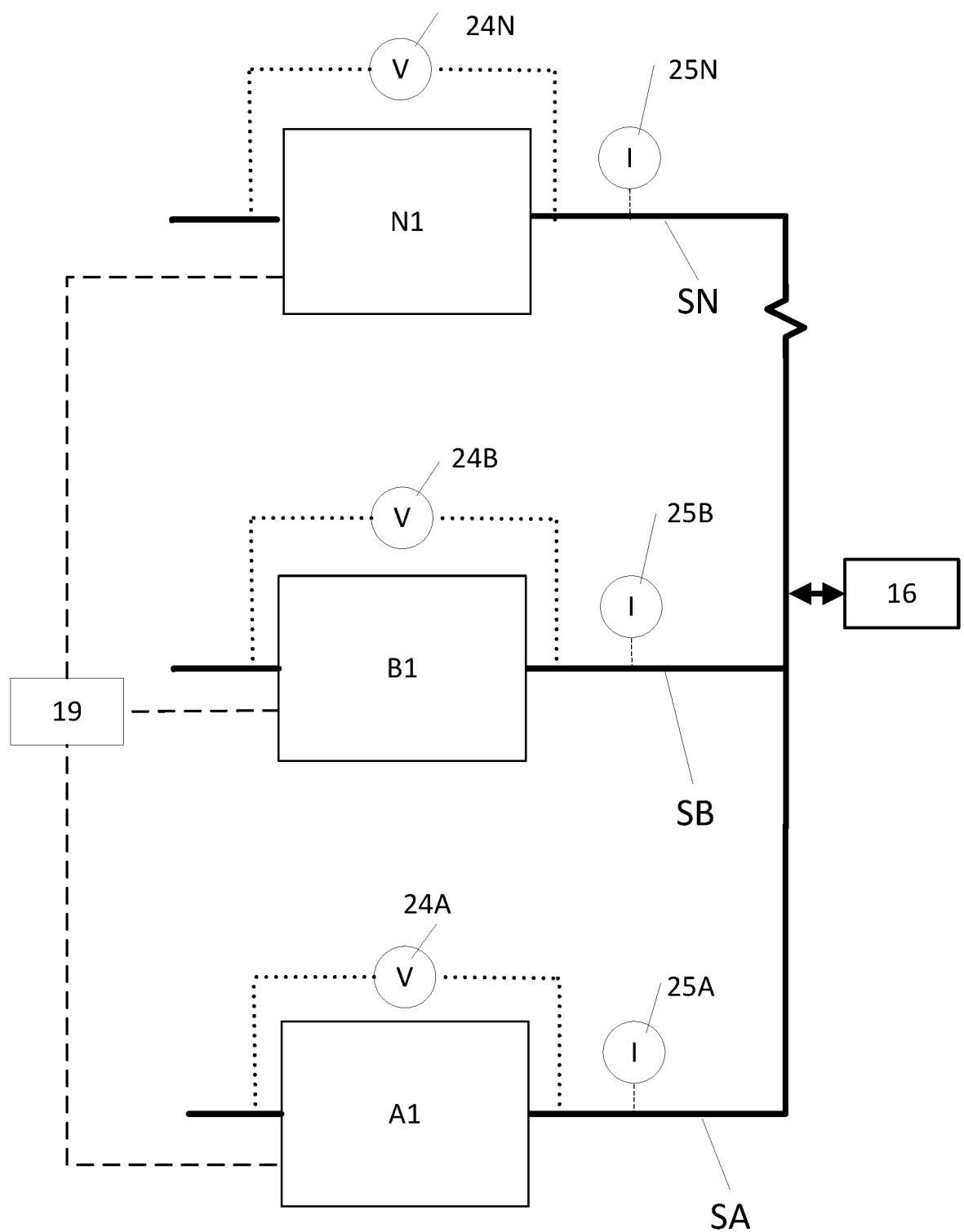
FIG. 2 shows a schematic of an embodiment of the invention comprising n flow battery unit strings electrically connected in parallel in which there is at least one flow battery unit in each of the N strings. Optional voltage and current sensors are provided in FIG. 2.

FIG. 2 shows a schematic of a flow battery array comprising a number N of flow battery unit strings SA, SB . . . , SN electrically connected in parallel. Here, there is at least one flow battery unit A1, B1, . . . N1 in each of the N strings. The location of optional voltage sensors 24A, 24B, . . . 24N and current sensors 25A, 25B, . . . 25N are shown here for purposes of measuring the resistance and rates of change of resistance of individual flow battery units in the strings.

Figure 3:
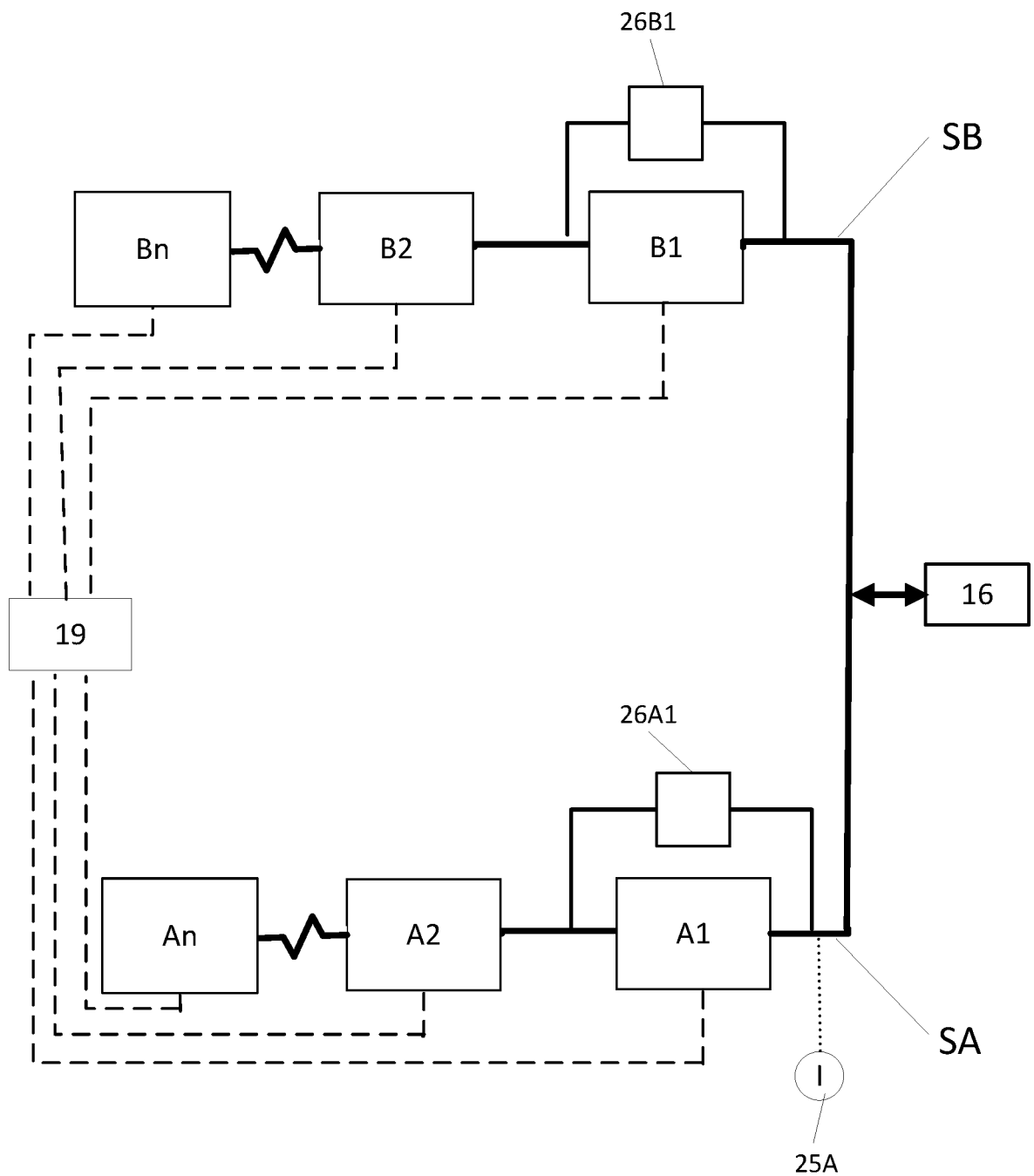
FIG. 3 shows a schematic of an embodiment of the invention comprising two flow battery unit strings electrically connected in parallel in which there are n flow battery units in each string. A current bypass device is provided across the first flow battery unit in each of the strings.

FIG. 3 shows a schematic of a flow battery array comprising two flow battery unit strings SA, SB electrically connected in parallel, and again in which there are n flow battery units A1, A2, . . . An and B1, B2, . . . Bn respectively in each string. Here, current bypass devices (CBDs) 26A1 and 26B1 are shown as being provided across the first flow battery units A1, B1 in each of the strings. The current bypass devices may be used to balance the state-of-charge between flow battery units within the flow battery unit strings by appropriately shunting current through the current bypass devices.

Figure 4:
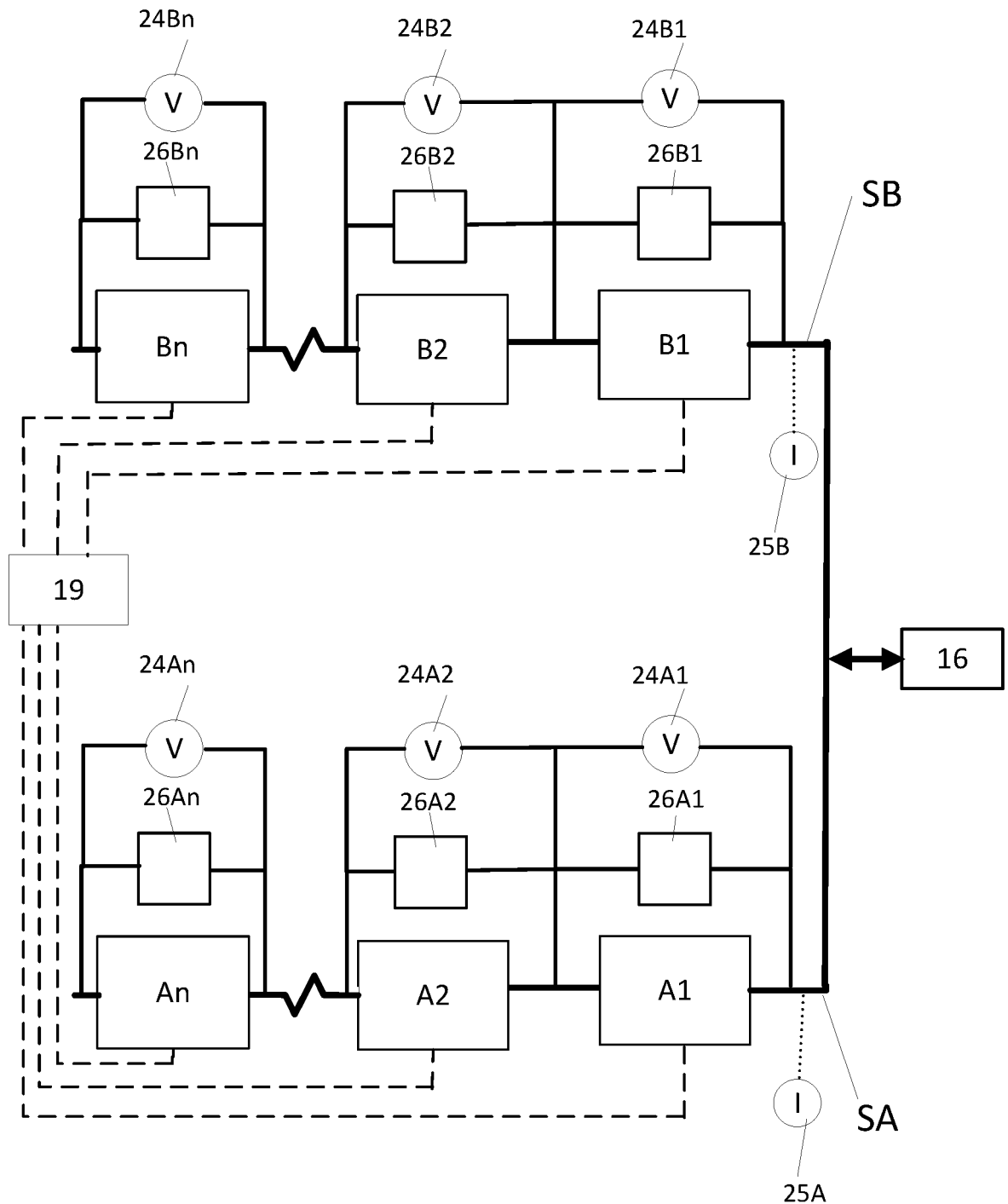
FIG. 4 shows a schematic of an embodiment of the invention comprising two flow battery unit strings electrically connected in parallel in which there are n flow battery units in each string. Current bypass devices and voltage sensors are provided across each flow battery unit in each of the strings and current sensors are provided in series with the strings.

FIG. 4 again shows a schematic of a flow battery array comprising two flow battery unit strings SA, SB electrically connected in parallel in which there are n flow battery units A1, A2, . . . An and B1, B2, . . . Bn in each string respectively. For preferred measuring and balancing purposes, current bypass devices 26A1, 26A2, . . . 26An, 26B1, 26B2, . . . 26Bn and voltage sensors 24A1, 24A2, . . . 24An, 24B1, 24B2, . . . 24Bn are provided across each flow battery unit in each of the strings and current sensors 25A and 25B are provided in series with the strings. As those of ordinary skill will recognize, each flow battery unit in string SA can provide it's SOC status input (not shown) to controller 19, which in turn can determine which current bypass device(s), 26A1, 26A2, . . . 26An etc. must be directed to bypass current via an output signal (not shown) and keep all flow battery units in string SA at the same electrolyte state of charge. This enabling control method works within one flow battery unit string, but not for multiple flow battery unit strings electrically in parallel.

Figure 5:
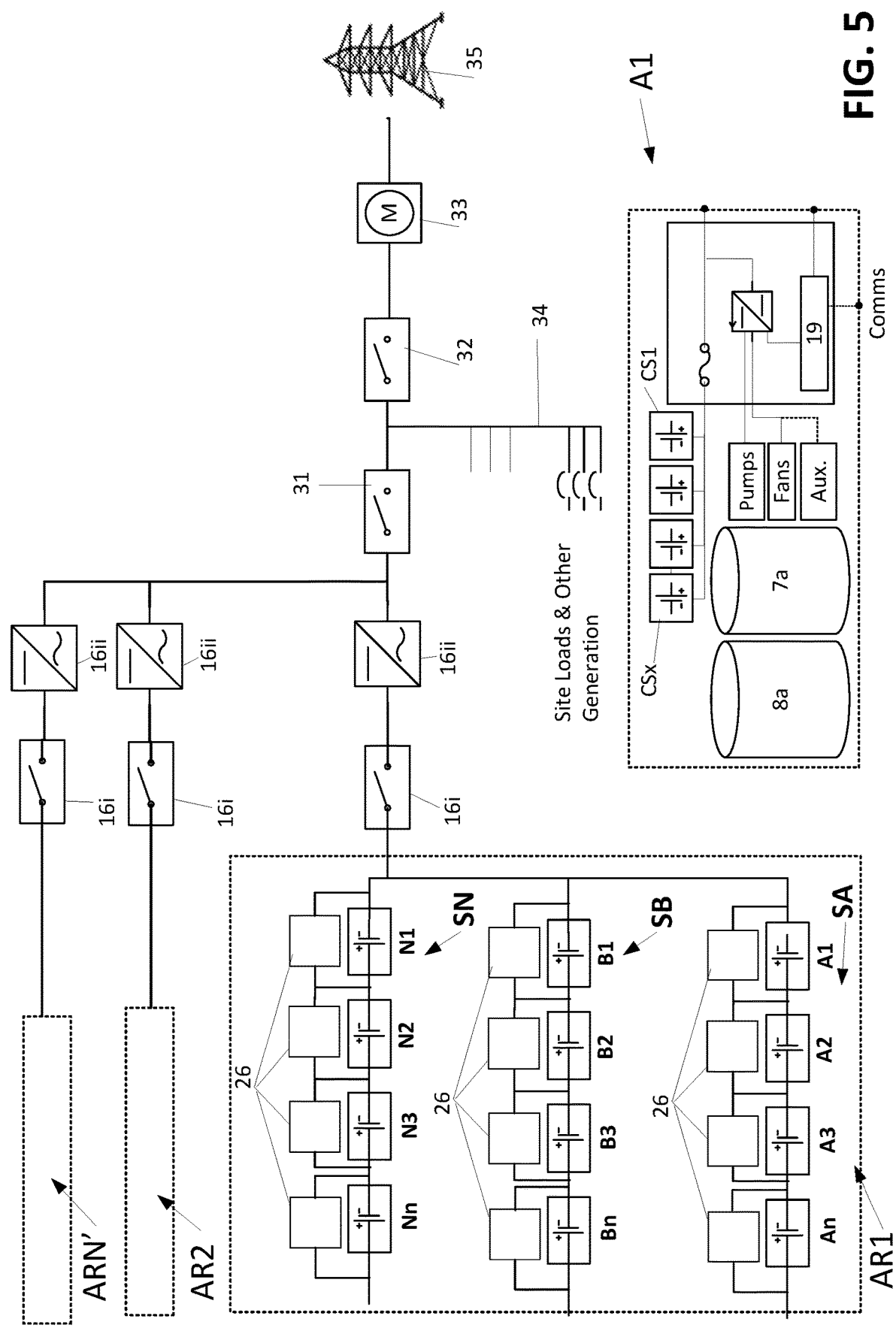
FIG. 5 shows a schematic of a complex embodiment of the invention suitable for use in commercial AC power applications. The embodiment shown comprises N' flow battery arrays of the invention electrically connected in parallel. The arrays comprise N flow battery unit strings electrically connected in parallel and n flow battery units in each of the flow battery unit strings. As shown, current bypass devices are provided across each flow battery unit.

FIG. 5 shows a schematic of a complex embodiment of the invention suitable for commercial use to connect to AC utilities. The embodiment shown comprises N' flow battery arrays of the invention electrically connected in parallel (i.e. AR1, AR2, ARN'). The arrays comprise N flow battery unit strings electrically connected in parallel (i.e. SA, SB, . . . SN) and n flow battery units (i.e. A1, A2, . . . An, B1, B2, . . . Bn, . . . N1, N1, . . . Nn) in each of the flow battery unit strings. [FIG. 5 also includes an enlarged view of battery unit A1 which itself comprises stacks of cells in parallel denoted CS1 to CSx here. Items common to FIG. 1 are numbered in a like manner. The enlarged view also shows other hardware associated with a battery unit string such as, pumps, fans, auxiliary equipment (aux.), and communication lines (comms.).] As shown in FIG. 5, current bypass devices are provided across each flow battery unit. Here, the controllable bi-directional power converters 16 associated with each array comprise a DC connect panel 16*i* and an associated AC/DC converter 16*ii*. FIG. 5 also shows other hardware typically appearing in connections to an AC utility, including an ESS connect panel and switchgear, main breakers, metering devices, site loads and AC lines.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A redox flow battery array comprising:
   at least two flow battery unit strings electrically connected in parallel wherein each flow battery unit string comprises at least one flow battery unit comprising:
   a flow battery string comprising at least one flow battery cell wherein each cell comprises an anode and a cathode, and is configured to receive flow battery unit electrolytes comprising an anolyte and a catholyte;
   an anolyte tank and a catholyte tank for storage of the anolyte and the catholyte of the flow battery unit electrolytes respectively;

an anolyte circuit comprising a supply line and a return line connecting the anolyte tank to the anodes in flow battery cells in the flow battery string;

a catholyte circuit comprising a supply line and a return line connecting the catholyte tank to cathodes in the flow battery cells in the flow battery string; and a state-of-charge measuring device capable of measuring the state of charge of the flow battery unit electrolytes in the flow battery unit;

a flow regulator in at least one of the anolyte and the catholyte circuits for regulating flow of at least one of the anolyte and the catholyte therethrough in at least one of the flow battery units in the at least two flow battery unit strings;

a controllable bi-directional power converter electrically connected to each of the at least two flow battery unit strings; and a controller with inputs connected to each of the state-of-charge measuring devices in the flow battery units and with an output connected to the flow regulator wherein the output of the controller controls the flow regulator so as to regulate the flow of at least one of the anolyte and the catholyte to the anodes and the cathodes in the flow battery cells in the flow battery string in accordance with the states of charge of the flow battery unit electrolytes in the flow battery units and thereby balance the state-of charge in the at least two flow battery unit strings.

2. The redox flow battery array of claim 1 wherein the array is absent any additional controllable bi-directional power converter electrically connected to any of the flow battery unit strings.

3. The redox flow battery array of claim 1 wherein the array is absent any subsystem for fluidly interconnecting and mixing the anolyte tank and the catholyte tank in accordance with the states of charge of the flow battery unit electrolytes in the flow battery units.

4. The redox flow battery array of claim 1 wherein the array comprises a plurality of flow battery unit strings electrically connected in parallel.

5. The redox flow battery array of claim 4 comprising a voltage sensor across the at least one flow battery unit in each of the flow battery unit strings and a current sensor in series with the at least one flow battery unit in each of the plurality of flow battery unit strings.

6. The redox flow battery array of claim 1 wherein each of the flow battery unit strings comprises at least two flow battery units electrically connected in series.

7. The redox flow battery array of claim 6 wherein each of the flow battery unit strings comprises a current bypass device electrically connected in parallel to at least one of the flow battery units in the flow battery unit strings.

8. The redox flow battery array of claim 7 wherein a current bypass device is electrically connected in parallel to each of flow battery units in each of the flow battery unit strings.

9. The redox flow battery array of claim 1 comprising a flow regulator in each of the anolyte and the catholyte circuits in each of the flow battery units in each of the flow battery unit strings regulating flow of each of the anolyte and the catholyte therethrough, wherein the controller comprises outputs connected to each of the flow regulators in each of the anolyte and the catholyte circuits.

10. The redox flow battery array of claim 1 wherein the state-of-charge measuring device in each of the at least one flow battery units comprises:

an unloaded reference flow battery cell supplied with the anolyte and the catholyte of the flow battery unit electrolytes; and a voltage sensor connected across the reference flow battery cell for measuring the open circuit voltage of the reference flow battery.

11. The redox flow battery array of claim 1 wherein the state-of-charge measuring device in each of the at least one flow battery units is selected from the group consisting of a colorimetric device optically accessing the flow battery unit electrolytes, a spectroscopic device optically accessing the flow battery unit electrolyte, and a potentiometric device.

12. The redox flow battery array of claim 1 wherein the flow battery cells in the flow battery strings are vanadium redox flow batteries.

13. A redox flow battery system comprising at least two of the redox flow battery arrays of claim 1 electrically connected in parallel.

14. A method for balancing the state-of-charge of the flow battery units in the redox battery array of claim 1 comprising balancing the state-of-charge of the flow battery unit strings, wherein the balancing the state-of-charge of the flow battery unit strings comprises the steps of:

using the state-of-charge measuring device, measuring the states-of-charge of the flow battery unit electrolytes in the flow battery unit in each of the at least two flow battery unit strings;

inputting the measured states-of-charge to the controller;

using the controller, determining a control signal for regulating the flow of at least one of the anolyte and the catholyte to the anodes and the cathodes in the flow battery cells in the at least one of the flow battery units in accordance with the states of charge of the flow battery unit electrolytes in the flow battery units so as to balance the state-of charge in the at least two flow battery unit strings; and outputting the control signal to the flow regulator.

15. The method of claim 14 wherein the state-of-charge measuring device in each of the at least one flow battery units comprises:

an unloaded reference flow battery cell supplied with the anolyte and the catholyte of the flow battery unit electrolytes; and a voltage sensor connected across the reference flow battery cell for measuring the open circuit voltage of the reference flow battery, and the step of measuring the states-of-charge comprises measuring the open circuit voltages of the unloaded reference flow battery cells.

16. The method of claim 14 wherein each of the flow battery unit strings comprises at least two flow battery units electrically connected in series and each of the flow battery unit strings comprises a current bypass device electrically connected in parallel to at least one of the flow battery units in the flow battery unit strings, the method additionally comprising:

balancing the state-of-charge between flow battery units within the flow battery unit strings by shunting current through one or more of the current bypass devices.

17. The method of claim 14 wherein the steps are performed when the array is charging or discharging via the controllable bi-directional power converter.

18. The method of claim 14 wherein the method steps are performed at times when the flow battery unit electrolytes are at a low or high state-of-charge.

19. A redox flow battery array configured to perform the method of claim 14, the redox flow battery array comprising:

at least two flow battery unit strings electrically connected in parallel wherein each flow battery unit string comprises at least one flow battery unit comprising:

a flow battery string comprising at least one flow battery cell wherein each cell comprises an anode and a cathode, and is configured to receive flow battery unit electrolytes comprising an anolyte and a catholyte;

an anolyte tank and a catholyte tank for storage of the anolyte and the catholyte of the flow battery unit electrolytes respectively;

an anolyte circuit comprising a supply line and a return line connecting the anolyte tank to the anodes in flow battery cells in the flow battery string;

a catholyte circuit comprising a supply line and a return line connecting the catholyte tank to cathodes in the flow battery cells in the flow battery string; and a state-of-charge measuring device capable of measuring the state of charge of the flow battery unit electrolytes in the flow battery unit;

a flow regulator in at least one of the anolyte and the catholyte circuits for regulating flow of at least one of the anolyte and the catholyte therethrough in at least one of the flow battery units in the at least two flow battery unit strings;

a controllable bi-directional power converter electrically connected to each of the at least two flow battery unit strings; and a controller with inputs connected to each of the state-of-charge measuring devices in the flow battery units and with an output connected to the flow regulator wherein the output of the controller controls the flow regulator so as to regulate the flow of at least one of the anolyte and the catholyte to the anodes and the cathodes in the flow battery cells in the flow battery string in accordance with the states of charge of the flow battery unit electrolytes in the flow battery units and thereby balance the state-of charge in the at least two flow battery unit strings.

20. The redox flow battery array of claim 1 wherein the controller controls the flow regulator so as to regulate the flow of at least one of the anolyte and the catholyte to the anodes and the cathodes in the flow battery cells in the flow battery string in accordance with the states of charge of the flow battery unit electrolytes in the flow battery units and thereby balance the state-of charge in the at least two flow battery unit strings during charging or discharging of the redox flow battery array by the controllable bi-directional power converter.

21. The redox flow battery array of claim 1 wherein the controller controls the flow regulator so as to regulate the flow of at least one of the anolyte and the catholyte to the anodes and the cathodes in the flow battery cells in the flow battery string in accordance with the states of charge of the flow battery unit electrolytes in the flow battery units and thereby balance the state-of charge in the at least two flow battery unit strings when the states of charge in the at least two flow battery unit strings diverge.

* * * * *